United States Patent Office 2,914,573
Patented Nov. 24, 1959

2,914,573

DEHYDROHALOGENATION OF BENZENE HEXACHLORIDE

George McCoy, Philadelphia, Charles E. Inman, Roslyn, and Glendon D. Kyker, Glenside, Pa., assignors to Pennsalt Chemicals Corporation, a corporation of Pennsylvania No Drawing. Application January 31, 1952
Serial No. 269,323

5 Claims. (Cl. 260—650)

This invention relates to the dehydrohalogenation of organic compounds by pyrolysis and more particularly to improvements in the dehydrohalogenation of cyclic halogenated compounds by pyrolysis to produce compounds having conjugated systems and "aromaticity."

The terms "aromaticity" and "aromatic character" as used herein, both in the specification and claims, are intended to indicate those compounds of peculiarly diminished unsaturation and pronounced tendency to the formation and preservation of type such as benzene, pyridene, pyrrole, thiophene, pyrazole, furane, etc.

It has heretofore been known that compounds of "aromatic character" having conjugated systems such as benzene and thiophene can be formed through the dehydrohalogenation of certain chlorinated cyclic compounds through the application of heat. F. E. Matthews, for example, in his article "The α and β Modifications of Benzene Hexachloride," Journal of the Chemical Society of London, vol. 59, Trans. 168–169 (1891), indicates that trichlorobenzene can be formed directly from benzene hexachloride by heating benzene hexachloride to sufficiently high temperatures to split out HCl. However, when attempts were made to convert chlorinated cyclic compounds into compounds of "aromatic character" having conjugated systems, as for example, the conversion of benzene hexachloride to trichlorobenzene, or the conversion of tetrachlorothiolane and hexachlorothiolane, respectively, to dichlorothiophene and tetrachlorothiophene through the application of heat alone it was found that relatively high temperatures were necessary. Thus, for the pyrolytic decomposition of benzene hexachloride to trichlorobenzene a temperature in excess of 500° C. was necessary before any appreciable dehydrohalogenation occurred.

The high temperatures necessary for carrying out these reactions by heat alone are unsatisfactory for several reasons. At elevated temperatures care must be taken in the selection of materials of construction for the apparatus employed since there is a tendency for most metals to be attacked by the reactants at elevated temperatures, the degree of attack increasing with increase in temperature. This is particularly true where dehydrohalogenation and chlorination are carried out simultaneously as described in our copending application, Serial No. 269,322, now U.S. Patent No. 2,778,860. Also, at temperatures much in excess of 300° C., there is a distinct tendency for the carbon to carbon linkage of many cyclic organic materials to be broken, resulting in the production of undesirable gummy materials and free carbon which must later be removed. A further disadvantage with respect to the use of high temperatures is the increased cost of operation due to the expense of heating the equipment and the reactants. Another objection to the use of heat alone for carrying out the reaction is the relatively slow rate at which dehydrohalogenation occurs particularly if attempts are made to carry out the reactions at sufficiently low temperatures to avoid at least in part the above mentioned difficulties.

When the metal and metal halides which are customarily used as catalysts in the dehydrohalogenation of chlorinated aliphatic compounds are employed, a slight reduction in temperature is obtained. However, the temperature necessary to obtain a suitable rate of dehydrohalogenation is still unsatisfactorily high, being in most instances above 400° C.

We have now discovered that reactions of the type described can be substantially accelerated and carried out at substantially lower temperatures if carried out in the presence of activated carbon. In most instances, through the use of activated carbon as a catalyst, the dehydrohalogenation can be carried out at temperatures as low as 190° C. Also, substantially all of the halogenated cyclic organic is converted into the desired product. This is surprising when it is considered that activated carbon, when employed as a catalyst in the dehydrohalogenation of chlorinated aliphatic compounds, is considerably inferior to metal and metal halides such as iron and $FeCl_3$ and materials such as Kaolin and fuller's earth.

The substantial improvement obtained, in the pyrolytic dehydrohalogenation of chlorinated cyclic organic compounds to produce cyclic compounds of "aromatic character," by carrying out the reactions in the presence of activated carbon is well illustrated by the following table.

TABLE

*First 15 minutes reflux of slurry of 100 grams benzene hexachloride in 100 grams of trichlorobenzene and catalyst*

|  | Ratio of Catalyst/BHC | g. HCl | Reflux Temperature, ° C. |
|---|---|---|---|
| Activated carbon: [1] | | | |
| Columbia SXW | 1:15 | 15.5 | 217 |
| Columbia G | 1:15 | 15.3 | 217 |
| Columbia L | 1:15 | 20.6 | 210 |
| Columbia SX | 1:15 | 15.0 | 217 |
| Columbia CXA | 1:5 | 30.8 | 210 |
| Columbia CXA | 1:10 | 25.1 | 212 |
| Columbia CXA | 1:15 | 20.9 | 214 |
| Columbia CXA | 1:20 | 17.5 | 217 |
| Norit 211 | 1:15 | 24.4 | 211 |
| Norit SG II Extra | 1:15 | 20.0 | 210 |
| Darco G-60 | 1:15 | 24.8 | 212 |
| Darco S-51 | 1:15 | 15.3 | 214 |
| Nuchar C-N | 1:15 | 14.1 | 226 |
| Cliffchar Activated | 1:15 | 14.2 | 217 |
| Carbon (not activated): [1] | | | |
| Cliffchar Unactivated | 1:15 | 0.2 | 232 |
| Tenn. Prod. & Chem. Co | 1:15 | 0.1 | 232 |
| Consolidated Chem. Ind | 1:15 | 0.6 | 228 |
| $FeCl_3$ | 1:15 | 0.0 | 232 |
| $Fe_2O_3$ | 1:15 | 0.0 | 232 |
| Iron Tacks | 1:15 | 0.0 | 230 |
| Bauxite | 1:15 | 0.0 | 232 |
| Fuller's Earth | 1:15 | 0.0 | 228 |
| Glass beads | 1:15 | 0.0 | 232 |

[1] Columbia—Manufactured by Union Carbide and Carbon Corp.; Norit—American Norit Co. (made from Florida pine charcoal); Darco—Darco Department, Atlas Powder Co. (made from lignite); Nuchar—Industrial Chemical Sales Division, West Virginia Pulp and Paper Co. (made from organic residue of cellulose manufacture which is carbonized); Cliffchar—Cliffs Dow Chemical Co. (both activated and unactivated made from northern hardwoods. Activated subjected to activating process of heating in an electric furnace in counter-current to steam).

The temperature at which dehydrochlorination can be carried out when using activated carbon as a catalyst is sufficiently low to permit the use of glass or glass-lined reaction vessels without fear of the glass softening at the temperature employed. Since glass is substantially unattacked by HCl or chlorine, the problem of corrosion of the apparatus employed is essentially avoided. The temperatures employed are also sufficiently low to permit the dehydrohalogenation to be carried out in a liquid medium. This is frequently desirable, particularly in batch processes where the reaction can be carried out in a liquid medium which is the same as the product being obtained. The use of activated carbon as a catalyst, however, is not limited to liquid phase reactions, since it is found that activated carbon also considerably enhances the reaction rate and reduces the reaction temperature where the materials being subjected to dehydrohalogenation are heated without any dilution, or where the reaction is carried out in the vapor phase.

The general concept of our invention is particularly useful in the production of trichlorobenzene from benzene hexachloride. The invention, however, is not limited to the production of these materials alone, since our invention also has considerable utility in the production of other cyclic chlorinated compounds of "aromatic character" having conjugated systems from halogenated cyclic compounds.

One of the primary reasons for preparing benzene hexachloride is the large demand for the gamma isomer, which has come to have increasing application as an insecticide.

However, there is, at present, no practical commercial way of chlorinating benzene so as to obtain substantially pure gamma benzene hexachloride as the resulting product. In the present commercial processes, the addition chlorination of benzene to benzene hexachloride yields a product which is primarily a mixture of benzene hexachloride isomers, the gamma isomer being only about 10 to 15% of the final chlorination product. Various methods have been devised to separate out components of the product which are particularly high in gamma content, which high gamma concentration materials are then used in the compounding of insecticide formulations. The remaining isomers of benzene hexachloride, however, have been of little use to date and, in many instances, create a disposal problem.

The conversion of these presently undesirable benzene hexachloride isomers into trichlorobenzene, which has considerable commercial utility, through dehydrohalogenation of the benzene hexachloride in the presence of activated carbon as a catalyst is, therefore, an important part of our present invention.

The preparation of trichlorobenzene from benzene hexachloride by pyrolysis without a catalyst or by decomposition through the use of alkalis has certain objectionable features. When pyrolysis without the aid of a catalyst is employed, the high temperatures required to decompose the benzene hexachloride to trichlorobenzene tend to produce a substantial amount of a black gummy residue. This gummy material must be removed in order to obtain trichlorobenzene in a satisfactorily pure state. When the benzene hexachloride is decomposed to the trichlorobenzene by the use of alkalis, such as refluxing the benzene hexachloride with sodium or potassium hydroxide in water or alcohol, the conversion obtained is relatively small. Also, the beta isomer is substantially unaffected. During the alkali method, some phenol compounds are formed and substantial amounts of salts are produced, which materials in themselves constitute a disposal problem.

By the production of trichlorobenzene from benzene hexachloride through the use of activated carbon as a catalyst in accordance with the present invention, the time for producing the trichlorobenzene is considerably reduced and the problems adherent to straight pyrolitic decomposition and the method employing alkalis are avoided. Also, by carrying out the reaction in the presence of activated carbon substantially pure trichlorobenzene is obtained, the only by-product being HCl which is obtained in a sufficiently pure state to enable its packaging and sale without further purification except possibly for the removal of any entrained organics. This is easily accomplished by passing the gas through a column packed with activated carbon.

The presently used commercial process for preparing trichlorobenzene is to chlorinate benzene in an iron reaction kettle in the absence of light. Ferric chloride formed during the chlorination process acts as a catalyst to aid in the substitution chlorination of the benzene. With this process the maximum yield of trichlorobenzene obtainable in any given run is approximately 57% calculated on the basis of the benzene employed. The remaining products are primarily both under and over chlorinated benzenes. These must be separated from the desired trichlorobenzene product together with the ferric chloride formed during the chlorination reaction. This separation of the trichlorobenzene from the side reaction product entails the use of expensive equipment as well as considerable time for handling.

When preparing trichlorobenzene in accordance with our present invention, these objectionable aspects of the prior art process are eliminated. The heretofore waste benzene hexachloride is converted directly to trichlorobenzene of sufficiently pure grade to be marketable as such without any further treatment other than possible scrubbing with alkali to remove any entrained HCl. The only side product is HCl which is in substantially pure form. The yields of commercial grade trichlorobenzene obtained by our process are also considerably improved, yields as high as 99.5% of the theoretical having been obtained.

When preparing trichlorobenzene in accordance with our present invention, the benzene hexachloride is placed in a suitable container in contact with the activated carbon and heated to a temperature of approximately 190 to 300° C. Temperatures higher than 300° C. can, of course, be employed if desired; the activated carbon would still aid in speeding up the reaction. However, high temperatures are objectionable for the reasons heretofore given. The reaction may, if desired, be carried out in a liquid medium, for example, by dissolving the benzene hexachloride in liquid trichlorobenzene, or the material may be introduced into the presence of the activated carbon in the form of solid or molten benzene hexachloride. In either case, the activated carbon acts to considerably reduced the temperature required for the dehydrohalogenation reaction. When carried out in a liquid medium, the dehydrochlorination is preferably carried out at a temperature of 200 to 230° C.

The HCl resulting from the dehydrohalogenation of the benzene hexachloride is continuously withdrawn from the reaction vessel during the process and is preferably collected in water, where it is absorbed. One of the advantages of our process is that the HCl evolved from the reaction is free from chlorine and of sufficient purity that, after possible treatment to remove entrained organics, it can be sold, chlorine free, or used directly as a high grade muriatic acid. Also, the trichlorobenzene product is substantially pure, no phenolic materials having been noted; there is, therefore, no problem with respect to disposal of undesirable side reaction products.

Our invention is further illustrated by the following examples:

EXAMPLE 1

A one liter, three-necked reaction flask was charged to approximately one half its capacity with activated carbon pellets. Trichlorobenzene was then added in an amount sufficient to cover the carbon. The flask was fitted with a thermometer, an addition port for solids and a two foot distillation column. The trichlorobenzene was heated to reflux temperatures (190 to 220° C.) and a portion of benzene hexachloride solids was added. There was an immediate evolution of HCl gas and trichlorobenzene began to distill from the top of the distillation column. Addition of the benzene hexachloride was continued until 1,191 grams had been added. When the liquid in the flask had reached the same volume as the initial charge of trichlorobenzene, the distillation was discontinued. At the end of this time 740 grams of trichlorobenzene product had been collected, this amount represented on a weight basis 99.5% of the theoretical yield based on the benzene hexachloride used. The trichlorobenzene initially present in the reaction flask acted both as a solubilizing agent and a heat transfer medium.

EXAMPLE 2

5 grams of hexachlorothiolane was heated in a small flask equipped with a reflux condenser to 230° C. at which temperature refluxing occurred. A small amount of HCl was liberated indicating slight decomposition of the hexachlorothiolane. 1 gram of Columbia Activated Carbon SXW of 6–8 mesh was added. Immediately there was a rapid evolution of HCl and the vapor temperature dropped to 175° C. This temperature was maintained for a few minutes, but as the amount of HCl evolved decreased the temperature slowly rose. After two hours the HCl evolved was nearly negligible and the temperature had risen to 228° C. Further addition of activated carbon caused no further release of HCl indicating that the reaction had gone to substantial completion. The product on analysis was found to be tetrachlorothiophene.

EXAMPLE 3

10 grams of tetrachlorothiolane was heated in a small distillation flask to 180° C. There was at this temperature a very slow evolution of HCl from the molten mass. On addition of 1 gram of Columbia Activated Carbon SXW, HCl was given off rapidly. Heating was continued at reflux temperature until no further evolution of HCl was apparent. The resulting product on distillation from the flask was found, after analysis, to be substantially pure dichlorothiophene.

EXAMPLE 4

A liquid chlorinated cyclohexane containing hepta, octa and nono chloro derivatives (the main constituent being nono chlorohexane) was heated with a small amount of Columbia Activated Carbon CXA. HCl was evolved very rapidly as a white solid formed. This solid product was worked up by recrystallizing from methyl alcohol and then from carbon tetrachloride-methyl alcohol-water to obtain hexachlorobenzene. The final hexachlorobenzene product had a melting point of 227–228° C.

EXAMPLE 5

10 grams of heptachlorocyclohexane was heated to approximately 240° C. and 1 gram of Columbia Activated Carbon SXW was added to the molten mass. HCl gas was given off rapidly, the rapid evolution of HCl beginning as soon as the activated carbon was added. The product on analysis was found to be tetrachlorobenzene.

EXAMPLE 6

8 grams of octachlorocyclohexane was heated in the presence of 1 gram of Columbia Activated Carbon SXW as described in Example 5. Again HCl was given off rapidly after the addition of activated carbon. The final product was a solid having a melting point of 83–85° C. and found to be, on analysis, pentachlorobenzene.

In describing our invention, examples have been given for the preparation of a few specific organic compounds of "aromatic character," trichlorobenzene, hexachlorobenzene, tetrachlorothiophene and dichlorothiophene. Our discovery and invention, however, is not limited to the preparation of these specific compounds. Neither is our invention limited to the specific activated carbons mentioned, since the invention in its broader aspects consists in the discovery that activated carbons as a class will catalyze reactions of the type wherein halogenated cyclic compounds by pyrolytic dehydrohalogenation are converted to compounds having conjugated systems and possessing "aromaticity."

Having thus described our invention, we claim:

1. The process of making trichlorobenzene from benzene hexachloride comprising contacting benzene hexachloride at a temperature of 190 to 300° C. with activated carbon.

2. The method of preparing trichlorobenzene comprising contacting molten benzene hexachloride with an activated carbon at a temperature of 200 to 300° C.

3. In the production of trichlorobenzene, the continuous process comprising passing benzene hexachloride into a reaction chamber containing activated carbon so as to bring said benzene hexachloride in contact with said activated carbon while maintaining said reaction chamber at a temperature of 200 to 300° C. and continuously removing the trichlorobenzene and HCl formed by the decomposition of said benzene hexachloride.

4. In the production of trichlorobenzene the process comprising passing a mixture of benzene hexachloride and trichlorobenzene into a reaction chamber containing activated carbon so as to bring said benzene hexachloride into contact with said activated carbon while heating said mixture in said reaction chamber to a temperature of 200 to 300° C., removing in the form of vapors the trichlorobenzene and HCl formed by the decomposition of the benzene hexachloride and cooling said vapors to condense out the trichlorobenzene.

5. A process for making trichlorobenzene having an enhanced 1,2,4-trichlorobenzene concentration by dehydrochlorination of benzene hexachloride which comprises contacting benzene hexachloride at a temperature of 190° to 300° C. with activated carbon.

References Cited in the file of this patent

UNITED STATES PATENTS 2,467,123     Fleck et al. _____ Apr. 12, 1949

FOREIGN PATENTS 955,816     France _____ July 4, 1949
503,063     Belgium _____ Nov. 5, 1951

OTHER REFERENCES

Pavolvich: Chem. Abstracts, 40, cl. 495 (1946).
Bobkov et al.: Chem. Abstracts, 41, cl. 2067 citing U.S.S.R. Patent 66,688, July 31, 1946.
Galitzenstein et al.: "Jour. Soc. Chem. Ind.," vol. 69, pages 298–304 (1950).